United States Patent
Zeng et al.

(10) Patent No.: US 12,046,718 B2
(45) Date of Patent: Jul. 23, 2024

(54) BATTERY CELL AND LITHIUM ION BATTERY

(71) Applicant: Ningde Amperex Technology Limited, Fujian (CN)

(72) Inventors: Qiao Zeng, Fujian (CN); Jing Jiang, Fujian (CN); KeFei Wang, Fujian (CN)

(73) Assignee: Ningde Amperex Technology Limited, Ningde (CN)

( * ) Notice: Subject to any disclaimer, the term of this patent is extended or adjusted under 35 U.S.C. 154(b) by 880 days.

(21) Appl. No.: 17/065,089

(22) Filed: Oct. 7, 2020

(65) Prior Publication Data

US 2021/0028497 A1   Jan. 28, 2021

Related U.S. Application Data

(63) Continuation of application No. PCT/CN2018/082717, filed on Apr. 11, 2018.

(51) Int. Cl.
*H01M 10/0585* (2010.01)
*H01M 10/0525* (2010.01)
*H01M 10/0587* (2010.01)

(52) U.S. Cl.
CPC ... *H01M 10/0585* (2013.01); *H01M 10/0525* (2013.01); *H01M 10/0587* (2013.01)

(58) Field of Classification Search
CPC ......... H01M 10/0585; H01M 10/0525; H01M 10/0431; H01M 4/70; H01M 4/64; H01M 10/058; Y02E 60/10
See application file for complete search history.

(56) References Cited

U.S. PATENT DOCUMENTS

2020/0075920 A1* 3/2020 Murai ............... H01M 10/0587
2021/0328250 A1* 10/2021 Maruyama .......... H01M 10/045

FOREIGN PATENT DOCUMENTS

| CN | 104685702 | 6/2015 |
|---|---|---|
| CN | 106299241 | 1/2017 |
| CN | 206250283 | 6/2017 |
| CN | 110199410 | 9/2019 |
| JP | H09259859 | 10/1997 |
| JP | 2000348754 | 12/2000 |
| JP | 2001319679 | 11/2001 |
| JP | 2012190588 | 10/2012 |
| JP | 2013134940 | 7/2013 |
| JP | 2015536036 | 12/2015 |

(Continued)

OTHER PUBLICATIONS

Machine translation of CN106299241, retrieved from <www.espacenet.com> on Jul. 12, 2023.*

(Continued)

*Primary Examiner* — Cynthia K Walls
(74) *Attorney, Agent, or Firm* — Maier & Maier, PLLC

(57) ABSTRACT

A battery cell, including a first electrode plate, a second electrode plate, a separator, and a first electrode tab. The separator is disposed between the first electrode plate and the second electrode plate. The first electrode plate, the second electrode plate, and the separator are wound along a length direction of the first electrode plate. The first electrode tab is located at an end in a width direction of the first electrode plate. In the length direction of the first electrode plate, the first electrode plate includes a first edge, and a first notch is disposed at the first edge.

18 Claims, 5 Drawing Sheets

(56) References Cited

FOREIGN PATENT DOCUMENTS

| JP | 2017069207 | 4/2017 | | |
|---|---|---|---|---|
| KR | 20110082892 | 7/2011 | | |
| WO | 2018099168 | 6/2018 | | |
| WO | WO 2018/084162 | * 11/2018 | .............. | H01M 4/02 |

OTHER PUBLICATIONS

Zeng, Qiao; International Search Report and Written Opinion for PCT/CN2018/082717, filed Apr. 11, 2018, mailed Dec. 20, 2018, 8 pgs.
Zeng, Qiao; Extended European Search Report for Application No. 18914898.4, filed Apr. 11, 2018, mailed Mar. 24, 2021, 7 pages.
Zeng, Qiao; Notice of Reasons for Refusal for Japanese Application No. 2020554875, filed, Apr. 11, 2018, mailed Oct. 5, 2021, 8 pages.
Zeng, Qiao; Office Action for Canadian Application No. 3,095,358, filed, Nov. 4, 2018, mailed Sep. 24, 2021, 5 pages.
Zeng, Qiao; Office Action for Chinese Application No. 201880088590. 4, filed, Apr. 11, 2018, mailed Sep. 7, 2021, 10 pages.
Zeng, Qiao; Office Action for Chinese Application No. 201880088590. 4, filed, Apr. 11, 2018, mailed Nov. 17, 2021, 10 pages.

* cited by examiner

BATTERY CELL AND LITHIUM ION BATTERY

CROSS REFERENCE TO RELATED APPLICATION

This application is a continuation application of the PCT international application Serial No. PCT/CN2018/082717, filed on Apr. 11, 2018, and the entire content of which is incorporated herein by reference.

TECHNICAL FIELD

This application relates to the battery field, and in particular, to a battery cell and a lithium-ion battery.

BACKGROUND

Lithium-ion batteries have been extensively applied to consumer electronics. However, due to features of the lithium-ion batteries, there are safety risks for the lithium-ion batteries. For example, during falling of consumer electronics, an outer aluminum foil is easily torn, causing a short-circuit failure in a battery. To resolve this problem, a lithium-ion battery with a double-side-coated electrode plate may be used, and its outermost layer is a separator. During falling, great friction between the outermost separator and a packaging bag can alleviate an impact, and short-circuit risks caused by tearing and damage can be greatly reduced because only the double-side-coated electrode plate exists externally. Because the electrode plate is coated completely and continuously, and there is only a difference on a tab side, it is difficult to distinguish a start end of a battery cell. If a start winding position is incorrect, tab misplacement is caused, and packaging is affected.

SUMMARY

In view of the existing problem in the related art, an objective of this application is to provide a battery cell in which a head portion and a tail portion of an electrode plate can be distinguished, and a lithium-ion battery.

To achieve the foregoing objective, this application provides a battery cell, including a first electrode plate, a second electrode plate, a separator, and a first electrode tab. The separator is disposed between the first electrode plate and the second electrode plate. The first electrode plate, the second electrode plate, and the separator are wound along a length direction of the first electrode plate. The first electrode tab is located at an end in a width direction of the first electrode plate. In the length direction of the first electrode plate, the first electrode plate includes a first edge, and a first notch is disposed at the first edge.

According to an embodiment of this application, the first electrode plate further includes a second edge opposite to the first edge in the length direction of the first electrode plate, and a second notch is disposed at the second edge.

According to an embodiment of this application, an opening direction of the first notch is opposite to an opening direction of the second notch.

According to an embodiment of this application, a symmetry axis of the first notch and a symmetry axis of the second notch are on one straight line.

According to an embodiment of this application, the first electrode plate includes a third edge in the length direction of the first electrode plate, a distance between a symmetry axis of the first notch and the third edge is ⅓ to ⅔ of a width of the first electrode plate; and a distance between a symmetry axis of the second notch and the third edge is ⅓ to ⅔ of the width of the first electrode plate.

According to an embodiment of this application, an opening width of the first notch is ⅐ to ⅗ of a width of the first electrode plate; and an opening width of the second notch is ⅐ to ⅗ of the width of the first electrode plate.

According to an embodiment of this application, in a length direction of the second electrode plate, the second electrode plate further includes a fourth edge, and a third notch is disposed at the fourth edge.

According to an embodiment of this application, the second electrode plate further includes a fifth edge opposite to the fourth edge in the length direction of the second electrode plate, and a fourth notch is disposed at the fifth edge.

According to an embodiment of this application, an opening direction of the third notch and an opening direction of the fourth notch are opposite.

According to an embodiment of this application, the second electrode plate includes a sixth edge in a length direction of the second electrode plate, a distance between a symmetry axis of the third notch and the sixth edge is ⅓ to ⅔ of a width of the second electrode plate; and a distance between a symmetry axis of the fourth notch and the sixth edge is ⅓ to ⅔ of the width of the second electrode plate.

According to an embodiment of this application, an opening width of the third notch is ⅐ to ⅗ of a width of the second electrode plate; and an opening width of the fourth notch is ⅐ to ⅗ of the width of the second electrode plate.

According to one embodiment of this application, the first electrode plate is a cathode electrode plate, and the second electrode plate is an anode electrode plate.

According to one embodiment of this application, the first notch is disposed in a start segment of the anode electrode plate, and the third notch is disposed in a tail segment of the cathode electrode plate.

According to one embodiment of this application, the first electrode plate includes a first current collector, the first electrode tab and the first current collector are integrally formed.

According to one embodiment of this application, a length of the first electrode tab is equal to a length of the first current collector in the length direction of the first electrode plate.

According to one embodiment of this application, an active material is provided on the first electrode plate and the first electrode tab, the active material on the first electrode plate and the active material on the first electrode tab are in contact with each other, a width of the active material on the first electrode tab is 0 mm to 2 mm in the width direction of the first electrode plate.

According to one embodiment of this application, an insulating layer is provided on the first electrode plate and the first electrode tab, the insulating layer on the first electrode plate and the insulating layer on the first electrode tab are in contact with each other.

According to one embodiment of this application, an active material is provided on the first electrode plate, an insulating layer is provided on the first electrode tab, the active material on the first electrode plate and the insulating layer on the first electrode tab are in contact with each other.

According to another embodiment of this application, a lithium-ion battery is further provided and includes the battery cell according to any one of the foregoing embodiments and a packaging bag for packaging the battery cell.

Beneficial effects of this application are as follows:

In this application, along the length direction of the first electrode plate that is unwound, the first electrode plate has the first end portion, and the first notch is disposed at the edge of the first end portion. This helps recognize the head portion and the tail portion of the first electrode plate, thereby avoiding direct action of external force on a single electrode plate during replacement of the battery cell, and further reducing safety risks during the replacement of the battery cell.

DESCRIPTION OF EMBODIMENTS

Figure 1:
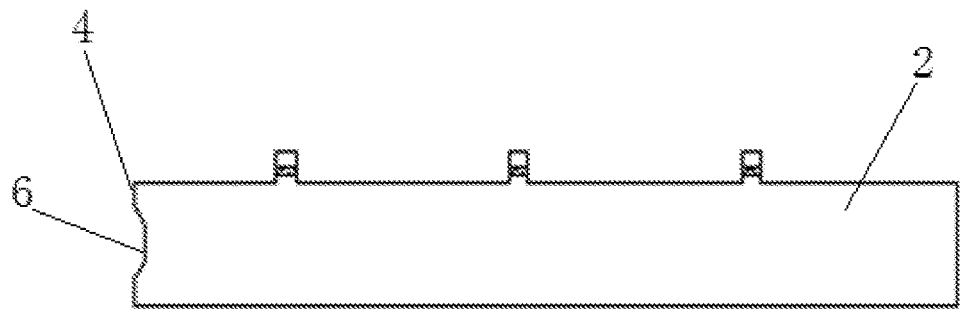
FIG. 1 is a top view of an embodiment of a first electrode plate of a battery cell according to this application.

Referring to FIG. 1, this application provides a battery cell 1, including a first electrode plate 2 that winds to form a part of the battery cell 1. Along a length direction of the first electrode plate 2 that is unwound, the first electrode plate 2 has a first end portion 4, and a first notch 6 is disposed at an edge of the first end portion 4.

In other words, a notch is disposed at one end of a continuously coated cathode electrode plate to help distinguish a head portion and a tail portion of the electrode plate, where one end of the electrode plate located in the battery cell is the head portion, and one end of the electrode plate located outside the battery cell is the tail portion. After the battery cell is used for a period of time, the battery cell usually needs to be replaced due to lifetime reduction. Disposing a notch on an electrode plate can avoid direct action of external force on a single electrode plate during replacement of the battery cell, and further reduce safety risks during the replacement of the battery cell.

Figure 2:
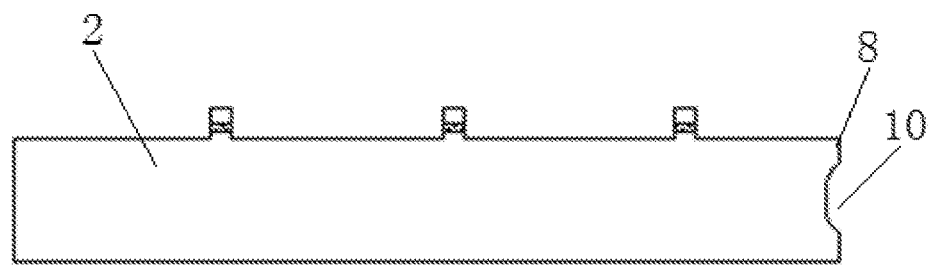
FIG. 2 is a top view of an embodiment of a first electrode plate of a battery cell according to this application.

Referring to FIG. 2, according to an embodiment of this application, the first electrode plate 2 further has a second end portion 8 opposite to the first end portion 4 along the length direction of the first electrode plate 2 that is unwound, and a second notch 10 is disposed at an edge of the second end portion 8.

It should be understood that a notch may be disposed in the first end portion 4 or the second end portion 8 of the first electrode plate 2, and used for determining a start winding position. In addition, during the replacement of the battery cell 1, the action of force on a single electrode plate can be avoided, and short-circuit risks can be reduced. Moreover, a distance between a center of the first notch 6 and the edge of the first end portion 4 of the first electrode plate 2 is $1/3$ to $2/3$ of a width of the first end portion 4, and a width of the first notch 6 is $1/7$ to $3/5$ of the width of the first end portion 4; and a distance between a center of the second notch 10 and the edge of the second end portion 8 of the first electrode plate 2 is $1/3$ to $2/3$ of a width of the second end portion 8, and a width of the second notch 10 is $1/7$ to $3/5$ of the width of the second end portion 8. If the first notch 6 or the second notch 10 is excessively large, a distance between an edge of the first notch 6 or the second notch 10 and an edge of the first electrode plate 2 is excessively small, and a coating easily falls down and causes a short circuit. If the first notch 6 or the second notch 10 is excessively small, the external force cannot be avoided effectively. In the description herein, the center of the first notch 6 is a deepest point of the first notch 6 recessed in the first electrode plate 2, and the center of the second notch 10 is a deepest point of the second notch 10 recessed in the first electrode plate 2. The width of the first end portion 4 or the second end portion 8 is a width along a width direction of the first electrode plate 2.

Figure 3:
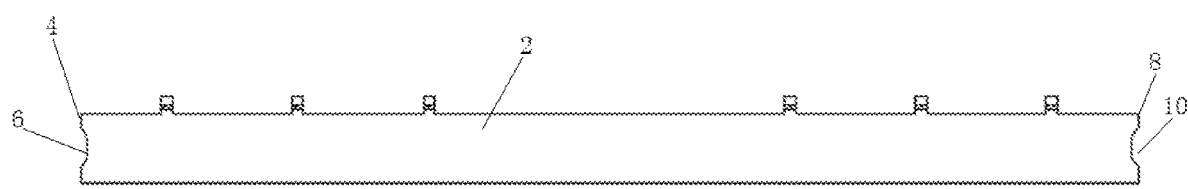
FIG. 3 is a top view of an embodiment of a first electrode plate of a battery cell according to this application.

According to an embodiment of this application, as shown in FIG. 3, the first notch 6 and the second notch 10 are disposed opposite to each other along the length direction of the first electrode plate 2 that is unwound, and opening directions of the first notch 6 and the second notch 10 are opposite. The first notch 6 is an axisymmetrical structure, and the second notch 10 is also an axisymmetrical structure. A symmetry axis of the first notch 6 and a symmetry axis of the second notch 10 are the same, that is, the two symmetry axes are on one straight line.

According to an embodiment of this application, one of the first end portion 4 and the second end portion 8 is a head portion of the first electrode plate 2, and the other one is a tail portion of the first electrode plate 2.

Figure 4:
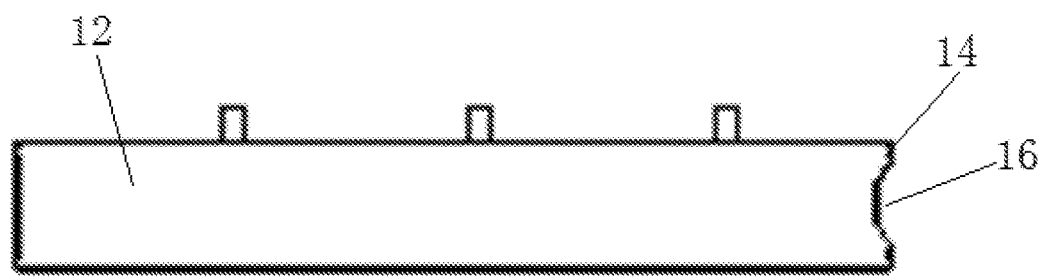
FIG. 4 is a top view of an embodiment of a second electrode plate of a battery cell according to this application.

Referring to FIG. 4, according to an embodiment of this application, the battery cell 1 further includes a second electrode plate 12 that winds to form a part of the battery cell 1, where along a length direction of the second electrode plate 12 that is unwound, the second electrode plate 12 has a third end portion 14, and a third notch 16 is disposed at an edge of the third end portion 14.

According to an embodiment of this application, the second electrode plate 12 further has a fourth end portion opposite to the third end portion 14 along the length direction of the second electrode plate 12 that is unwound, and a fourth notch is disposed at an edge of the fourth end portion.

According to the foregoing embodiment, a notch may be disposed in the third end portion 14 or the fourth end portion of the second electrode plate 12, and used for determining a start winding position. In addition, during the replacement of the battery cell 1, the action of force on a single electrode plate can be avoided, and short-circuit risks can be reduced. Moreover, a distance between a center of the third notch 16 and the edge of the third end portion 14 of the second electrode plate 12 is $1/3$ to $2/3$ of a width of the third end portion 14, and a width of the third notch 16 is $1/7$ to $3/5$ of the width of the third end portion; and a distance between a center of the fourth notch and the edge of the fourth end portion of the second electrode plate 12 is $1/3$ to $2/3$ of a width of the fourth end portion, and a width of the fourth notch is $1/7$ to $3/5$ of the width of the fourth end portion. If the third notch 16 or the fourth notch is excessively large, a distance between an edge of the third notch 16 or the fourth notch and an edge of the second electrode plate 12 is excessively small, and a coating easily falls down and causes a short circuit. If the third notch 16 or the fourth notch is excessively small, the external force cannot be avoided effectively.

According to an embodiment of this application, the third notch 16 and the fourth notch are disposed opposite to each other along the length direction of the second electrode plate that is unwound, and opening directions of the third notch 16 and the fourth notch are opposite.

According to an embodiment of this application, one of the third end portion 14 and the fourth end portion is a head portion of the second electrode plate 12, and the other one is a tail portion of the second electrode plate 12.

According to an embodiment of this application, one of the first electrode plate 2 and the second electrode plate 12 is a cathode electrode plate, and the other one is an anode electrode plate. In an embodiment, the first notch 6 is disposed in a start segment of the anode electrode plate, and the third notch 16 is disposed in a tail segment of the cathode electrode plate. Certainly, it should be understood that various appropriate structures may also be used in other optional embodiments.

According to an embodiment of this application, the battery cell 1 further includes a separator that winds to form a part of the battery cell 1, where the separator is disposed between the first electrode plate 2 and the second electrode plate 12.

FIG. 5 to FIG. 8 are schematic diagrams of various embodiments of an electrode plate of a battery cell 1 according to this application. In the following descriptions, a first electrode plate 2 being a cathode electrode plate is used as an example to describe various structures of an electrode plate. However, it should be understood that the structures of the electrode plate described hereinafter are also applicable to an anode electrode plate (for example, a second electrode plate 12), that is, the following descriptions do not constitute any limitation on this application.

Figure 5:
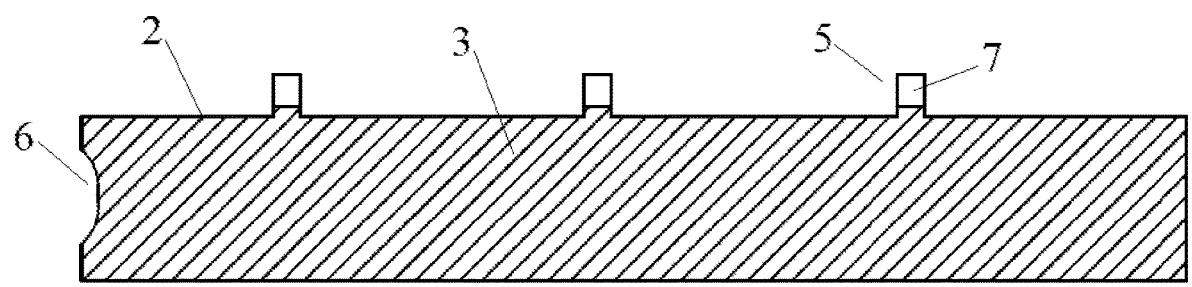
FIG. 5 to FIG. 8 are schematic diagrams of various embodiments of an electrode plate of a battery cell according to this application.

As shown in FIG. 5, in this embodiment, both sides of the cathode electrode plate 2 are coated with a cathode active material 3, and the cathode electrode plate 2 includes a first notch 6. Specifically, in this embodiment, the cathode electrode plate 2 has a plurality of tabs 5. The tab 5 protrudes from an edge of a cathode current collector 7, and a top of the cathode active material 3 protrudes from the edge of the cathode current collector 7 for approximately 0 mm to 2 mm. To be specific, in this embodiment, the top of the cathode active material 3 is located between an edge of the cathode electrode plate 2 and an edge of the tab 5.

Figure 6:
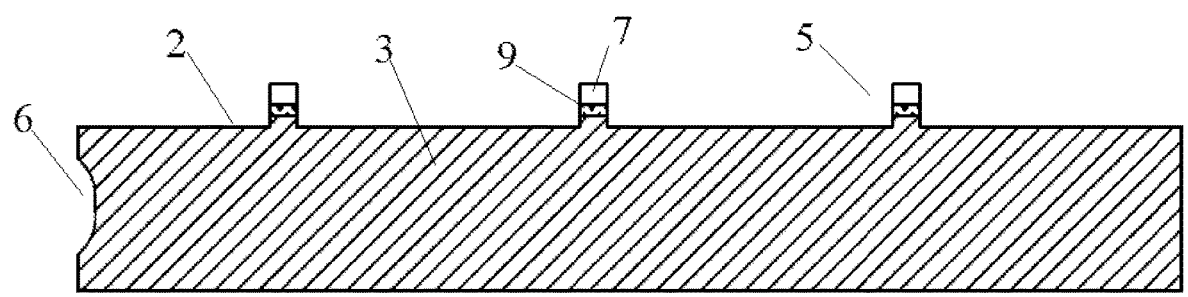

As shown in FIG. 6, in this embodiment, both sides of the cathode electrode plate 2 are coated with a cathode active material 3, and the cathode electrode plate 2 includes a first notch 6. Specifically, in this embodiment, the cathode electrode plate 2 has a plurality of tabs 5. The tab 5 protrudes from an edge of a cathode current collector 7, and a top of the cathode active material 3 protrudes from the edge of the cathode current collector 7 for approximately 0 mm to 2 mm. In addition, a difference from the embodiment shown in FIG. 5 lies in that the embodiment in FIG. 6 further includes an insulation layer 9, where the insulation layer 9 is applied in a position of the tab 5 and adjoins the active material 3.

Figure 7:
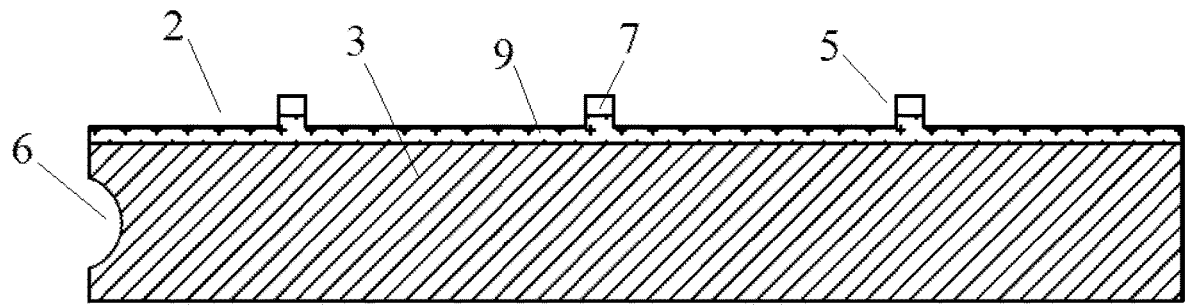

Further, as shown in FIG. 7, in this embodiment, both sides of the cathode electrode plate 2 are coated with a cathode active material 3, and the cathode electrode plate 2 includes a first notch 6. Specifically, in this embodiment, the cathode electrode plate 2 has a plurality of tabs 5, and the tab 5 protrudes from an edge of a cathode current collector 7. In addition, this embodiment further includes an insulation layer 9. A difference from the embodiment shown in FIG. 6 lies in that the insulation layer 9 in FIG. 7 extends to middle and lower portions of the tab 5 along an edge of a coating area of the active material 3.

Figure 8:
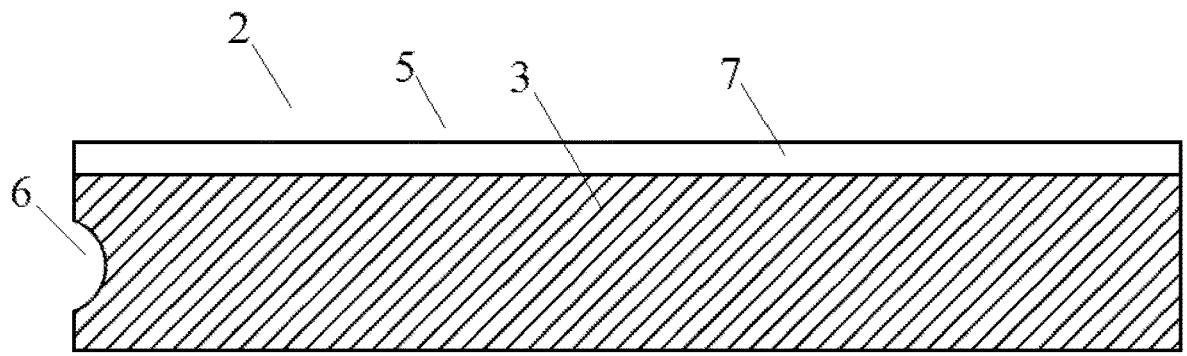

As shown in FIG. 8, in this embodiment, both sides of the cathode electrode plate 2 are coated with a cathode active material 3, and the cathode electrode plate 2 includes a first notch 6. A difference from the foregoing embodiment lies in that the embodiment shown in FIG. 8 includes a tab 5 whose length is the same as that of a cathode current collector 7, and that the tab 5 protrudes from a top of the cathode current collector 7.

It should be understood that in the foregoing descriptions, the first electrode plate 2 is used as a cathode electrode plate for description. All the foregoing structures may also be applied to an anode electrode plate. The foregoing descriptions are only embodiments of this application, and do not constitute any limitation on this application.

Figure 9:
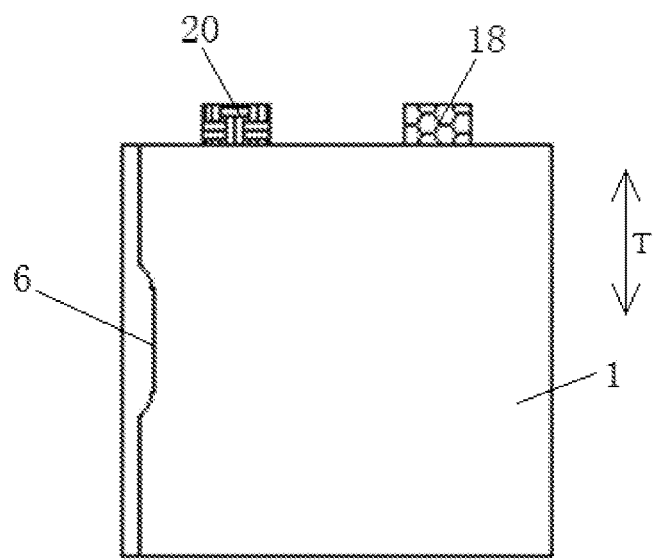
FIG. 9 is a top view of an embodiment of a battery cell according to this application, where tabs are located on one side of the battery cell.
Figure 10:
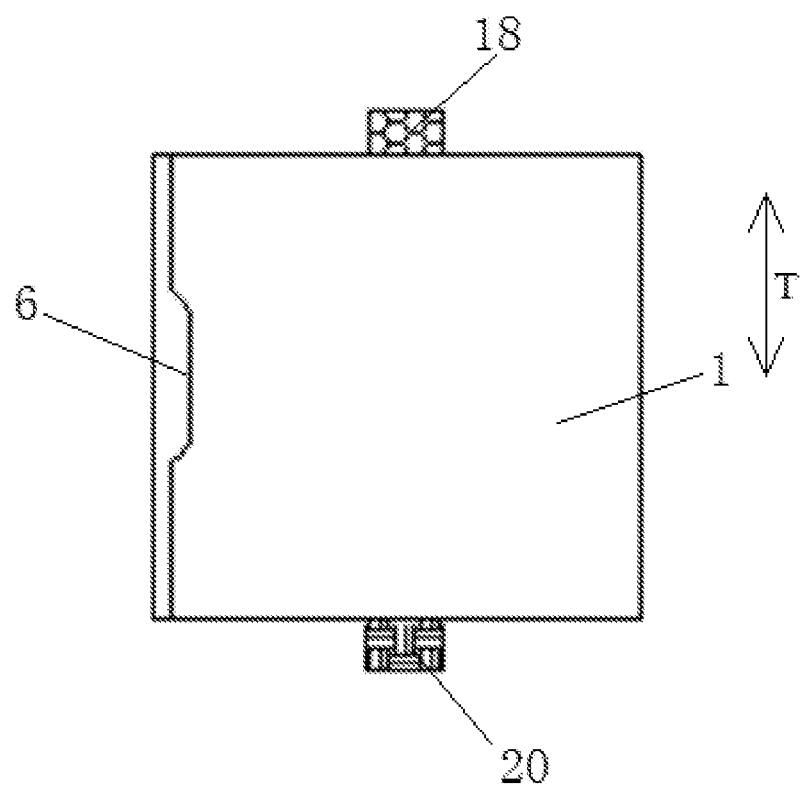
FIG. 10 is a top view of another embodiment of a battery cell according to this application, where tabs are located on two sides of the battery cell.

Referring to FIG. 9 and FIG. 10, according to any one of the foregoing embodiments of this application, along a thickness direction of the battery cell 1, a tab 18 is disposed on a top of the battery cell 1. According to an embodiment of this application, along the thickness direction T, a tab 20 is disposed at a bottom of the battery cell 1 opposite to the top. It should be understood that the tabs may be located on one side of the battery cell 1, or may be located on two sides of the battery cell 1. Specifically, in the embodiment shown in FIG. 9, the tabs 18 and 20 may be disposed on the top in the thickness direction T of the battery cell 1. In the embodiment shown in FIG. 10, the tab 18 may be disposed on the top of the battery cell 1, and the tab 20 may be disposed at the bottom of the battery cell 1. Certainly, it should be understood that locations and structures of the tabs may be determined based on specific usage.

Disposing a notch in a head portion or a tail portion of an electrode plate helps recognize the head portion and the tail portion of the electrode plate. In particular, when an electrode plate is disposed on both the top and the bottom of the battery cell, it is difficult to distinguish a head portion and a tail portion of the electrode plate. After a notch is disposed, the head portion and the tail portion can be easily distinguished, and tab misplacement caused by an incorrect start winding position and a further impact on packaging of the battery cell can be avoided effectively.

Figure 11:
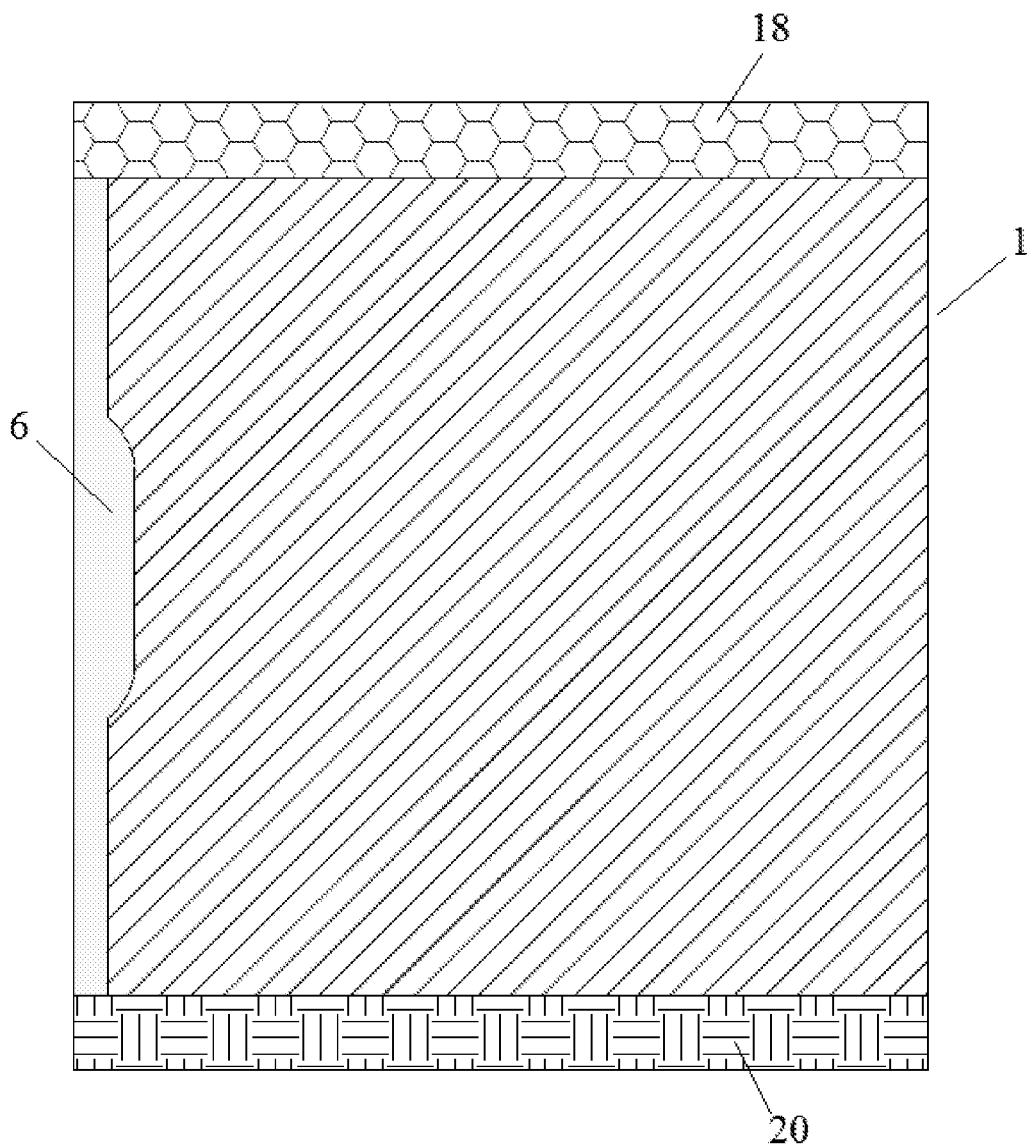
FIG. 11 is a top view of an embodiment of a battery cell according to this application, where tabs are not sliced.

Referring to FIG. 11, an embodiment of this application further provides another optional structure. FIG. 11 is a top view of an embodiment of a battery cell 1 according to this application, where tabs are not sliced. Specifically, the tabs 18 and 20 may be disposed on the top and bottom of the battery cell 1 respectively, but the tabs 18 and 20 in this embodiment are not sliced, so that the battery cell 1 includes tabs whose lengths are the same as that of a current collector. Certainly, it should be understood that the foregoing descriptions are only exemplary embodiments of this application. In an optional embodiment, the structures shown in FIG. 9 and FIG. 10 may be used, or the structure shown in FIG. 11 may be used. In addition, the tab 18 may be sliced, but the tab 20 is not sliced, or vice versa. Therefore, the foregoing embodiments do not constitute any limitation on this application.

According to another embodiment of this application, a lithium-ion battery is further provided and includes the battery cell 1 according to any one of the foregoing embodiments and a packaging bag for packaging the battery cell 1.

The foregoing descriptions are only preferred embodiments of this application, and are not intended to limit this application. For a person skilled in the art, this application may be subject to various changes and variations. Any modifications, equivalent replacements, improvements, and the like made within the spirit and principle of this application shall fall within the protection scope of this application.

What is claimed is:

1. A lithium-ion battery, comprising a battery cell and a packaging bag for packaging the battery cell, the battery cell comprises:
   a first electrode plate;
   a second electrode plate;
   a separator disposed between the first electrode plate and the second electrode plate; the first electrode plate, the second electrode plate, and the separator are wound along a length direction of the first electrode plate;
   a first electrode tab located at an end in a width direction of the first electrode plate;
   wherein in the length direction of the first electrode plate, the first electrode plate comprises a first edge, and a first notch is disposed at the first edge, and
   wherein the first electrode plate further comprises a third edge in the length direction of the first electrode plate, a distance between a symmetry axis of the first notch and the third edge is ⅓ to ⅔ of a width of the first electrode plate.

2. The lithium-ion battery according to claim 1, wherein the first electrode plate further comprises a second edge opposite to the first edge in the length direction of the first electrode plate, and a second notch is disposed at the second edge.

3. The lithium-ion battery according to claim 2, wherein an opening direction of the first notch is opposite to an opening direction of the second notch.

4. The lithium-ion battery according to claim 2, wherein a symmetry axis of the first notch and a symmetry axis of the second notch are on one straight line.

5. The lithium-ion battery according to claim 2, wherein a distance between a symmetry axis of the second notch and the third edge is ¼ to ⅔ of the width of the first electrode plate.

6. The lithium-ion battery according to claim 2, wherein an opening width of the first notch is ⅐ to ⅗ of a width of the first electrode plate; and an opening width of the second notch is ⅐ to ⅗ of the width of the first electrode plate.

7. The lithium-ion battery according to claim 1, wherein in a length direction of the second electrode plate, the second electrode plate comprises a fourth edge, and a third notch is disposed at the fourth edge.

8. The lithium-ion battery according to claim 7, wherein the second electrode plate further comprises a fifth edge opposite to the fourth edge in the length direction of the second electrode plate, and a fourth notch is disposed at the fifth edge.

9. The lithium-ion battery according to claim 8, wherein an opening direction of the third notch is opposite to an opening direction of the fourth notch are opposite.

10. The lithium-ion battery according to claim 8, wherein the second electrode plate comprises a sixth edge in a length direction of the second electrode plate, a distance between a symmetry axis of the third notch and the sixth edge is ¼ to ⅔ of a width of the second electrode plate; and a distance between a symmetry axis of the fourth notch and the sixth edge is ¼ to ⅔ of the width of the second electrode plate.

11. The lithium-ion battery according to claim 8, wherein an opening width of the third notch is ⅐ to ⅗ of a width of the second electrode plate; and an opening width of the fourth notch is ⅐ to ⅗ of the width of the second electrode plate.

12. The lithium-ion battery according to claim 1, wherein the first electrode plate is a cathode electrode plate, and the second electrode plate is an anode electrode plate.

13. The lithium-ion battery according to claim 12, wherein the first notch is disposed in a start segment of the anode electrode plate, and the third notch is disposed in a tail segment of the cathode electrode plate.

14. The lithium-ion battery according to claim 1, wherein the first electrode plate comprises a first current collector; the first electrode tab and the first current collector are integrally formed.

15. The lithium-ion battery according to claim 14, wherein a length of the first electrode tab is equal to a length of the first current collector in the length direction of the first electrode plate.

16. The lithium-ion battery according to claim 1, wherein an active material is provided on the first electrode plate and the first electrode tab; the active material on the first electrode plate and the active material on the first electrode tab are in contact with each other; and a width of the active material on the first electrode tab is 0 mm to 2 mm in the width direction of the first electrode plate.

17. The lithium-ion battery according to claim 1, wherein an insulating layer is provided on the first electrode plate and the first electrode tab; the insulating layer on the first electrode plate and the insulating layer on the first electrode tab are in contact with each other.

18. The lithium-ion battery according to claim 1, wherein an active material is provided on the first electrode plate; an insulating layer is provided on the first electrode tab; the active material on the first electrode plate and the insulating layer on the first electrode tab are in contact with each other.

* * * * *